US008423398B2

(12) United States Patent
Dao et al.

(10) Patent No.: US 8,423,398 B2
(45) Date of Patent: Apr. 16, 2013

(54) ANALYTICALLY DETERMINING REVENUE OF INTERNET COMPANIES USING INTERNET METRICS

(75) Inventors: Fu-Tak Dao, Bridgewater, NJ (US); Ricardo Martija, East Brunswick, NJ (US); Thomas Spacek, Albuquerque, NM (US); Samaradasa Weerahandi, Pittstown, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 0 days.

(21) Appl. No.: 11/975,532

(22) Filed: Oct. 19, 2007

(65) Prior Publication Data
US 2008/0059262 A1 Mar. 6, 2008

Related U.S. Application Data

(62) Division of application No. 10/139,503, filed on May 3, 2002.

(60) Provisional application No. 60/288,769, filed on May 4, 2001.

(51) Int. Cl.
*G06Q 10/00* (2012.01)

(52) U.S. Cl.
USPC .......................................... 705/7.29; 705/7.11

(58) Field of Classification Search ......... 705/7.11–7.42
See application file for complete search history.

(56) References Cited

U.S. PATENT DOCUMENTS

| | | | | |
|---|---|---|---|---|
| 5,436,965 A * | 7/1995 | Grossman et al. | ....... | 379/266.08 |
| 5,459,656 A | 10/1995 | Fields et al. | ..................... | 705/7 |
| 5,692,107 A * | 11/1997 | Simoudis et al. | ............... | 706/12 |
| 5,712,985 A * | 1/1998 | Lee et al. | ..................... | 705/7.31 |
| 5,761,442 A * | 6/1998 | Barr et al. | ................... | 705/36 R |
| 6,032,125 A | 2/2000 | Ando | ............... | 705/10 |
| 6,101,460 A * | 8/2000 | Brinkerhoff et al. | ......... | 702/179 |
| 6,128,663 A * | 10/2000 | Thomas | ....................... | 709/228 |
| 6,178,451 B1 | 1/2001 | Huitema et al. | .............. | 709/224 |
| 6,321,205 B1 * | 11/2001 | Eder | ............................ | 705/7.37 |
| 6,351,467 B1 * | 2/2002 | Dillon | ............................ | 370/432 |

(Continued)

OTHER PUBLICATIONS

WebTrends and Oracle Team to Provide Powerful Visitor Data Mining Solution (Business/Hi-Tech Editors, Business Wire. New York: Jun. 26, 2000. p. 1).*

(Continued)

*Primary Examiner* — Johnna Loftis
*Assistant Examiner* — Alan S Miller
(74) *Attorney, Agent, or Firm* — Fitch, Even, Tabin & Flannery LLP (57) ABSTRACT

With respect to a current quarter of unreported revenue for certain Internet companies, by processes performed by a computer revenue to date is analytically determined and future revenue for the remaining quarter is statistically projected by modeling revenue based on "Internet metrics". Actual revenue performance is obtained and one or more "Internet metrics" are measured for a given Internet company. Using the revenue and measured Internet metric data from prior quarters, a regression analysis is performed in order to generate multiple models that reflect the relationship between the Internet metrics and revenue. From these models, one is selected that will most likely yield the best revenue estimates. This resultant model and current Internet metric data are subsequently used to estimate the company's revenue for the current day, week, month, or quarter. These estimates are also used to project the company's revenue for future days, weeks, months, and quarters.

20 Claims, 3 Drawing Sheets

U.S. PATENT DOCUMENTS

| | | | |
|---|---|---|---|
| 6,393,406 B1* | 5/2002 | Eder | 705/7.37 |
| 6,473,084 B1* | 10/2002 | Phillips et al. | 345/440 |
| 6,519,572 B1* | 2/2003 | Riordan et al. | 705/16 |
| 6,546,379 B1* | 4/2003 | Hong et al. | 706/14 |
| 6,567,850 B1* | 5/2003 | Freishtat et al. | 709/224 |
| 6,587,878 B1* | 7/2003 | Merriam | 709/224 |
| 6,606,615 B1* | 8/2003 | Jennings et al. | 706/45 |
| 6,611,726 B1* | 8/2003 | Crosswhite | 700/99 |
| 6,631,372 B1* | 10/2003 | Graham | 705/26.8 |
| 6,754,470 B2* | 6/2004 | Hendrickson et al. | 455/67.11 |
| 6,839,680 B1 | 1/2005 | Liu et al. | 705/10 |
| 7,080,026 B2* | 7/2006 | Singh et al. | 705/7.31 |
| 7,107,192 B1* | 9/2006 | Cung et al. | 703/2 |
| 7,181,412 B1* | 2/2007 | Fulgoni et al. | 705/7.32 |
| 7,451,134 B2* | 11/2008 | Krakowiecki et al. | 1/1 |
| 7,660,705 B1* | 2/2010 | Meek et al. | 703/2 |
| 2001/0034686 A1* | 10/2001 | Eder | 705/36 |
| 2001/0041995 A1* | 11/2001 | Eder | 705/7 |
| 2002/0013823 A1* | 1/2002 | Eubanks | 709/217 |
| 2002/0065699 A1* | 5/2002 | Talluri | 705/8 |
| 2002/0161763 A1* | 10/2002 | Ye et al. | 707/7 |
| 2002/0165756 A1* | 11/2002 | Tobin et al. | 705/10 |
| 2002/0169657 A1* | 11/2002 | Singh et al. | 705/10 |
| 2002/0186237 A1* | 12/2002 | Bradley et al. | 345/736 |
| 2003/0014336 A1 | 1/2003 | Dao et al. | |
| 2003/0018550 A1* | 1/2003 | Rotman et al. | 705/35 |
| 2003/0206554 A1* | 11/2003 | Dillon | 370/432 |
| 2004/0015715 A1* | 1/2004 | Brown | 713/200 |
| 2004/0049470 A1 | 3/2004 | Ouimet | 705/400 |
| 2004/0225556 A1 | 11/2004 | Willen et al. | 705/10 |
| 2005/0262240 A1* | 11/2005 | Drees et al. | 709/224 |
| 2008/0046348 A1 | 2/2008 | Dao et al. | |
| 2008/0059262 A1* | 3/2008 | Dao et al. | 705/7 |

OTHER PUBLICATIONS

WebTrends Announces CommerceTrends, Industry's First E-Business Measurement and Forecasting Solution (Business Editors, Business Wire. New York: Jun. 21, 1999. p. 1).*

Making the Profit Connection (Mike Heck, Infoworld: Jun. 21, 1999; 21, 25; ABI/INFORM Global p. 67).*

Going beyond hit counts (Todd Coopee, Infoworld: Jul. 17, 2000; 22, 29; ABI/INFORM Global p. 45).*

Back to Basics: Forecasting the Revenues of Internet Firms (Brett Trueman; M.H. Franco Wong; Xiao-Jun Zhang, Review of Accounting Studies; Jun.-Sep. 2001; 6,2-3; ABM/INFORM Global p. 305).*

U.S. Appl. No. 10/139,503, Non-Final Office Action mailed Mar. 17, 2009.

U.S. Appl. No. 10/139,503, Final Office Action mailed Jan. 19, 2010.

U.S. Appl. No. 10/139,503, Examiner's Answer mailed Sep. 14, 2010.

U.S. Appl. No. 10/139,503, Appeal Decision mailed Jul. 10, 2012.

U.S. Appl. No. 10/139,503, Non-Final Office Action mailed Oct. 9, 2012.

U.S. Appl. No. 11/975,533, Non-Final Office Action mailed Jun. 18, 2009.

U.S. Appl. No. 11/975,533, Final Office Action mailed Jan. 20, 2010.

U.S. Appl. No. 11/975,533, Examiner's Answer mailed Sep. 15, 2010.

U.S. Appl. No. 11/975,533, Appeal Decision mailed Jul. 10, 2012.

U.S. Appl. No. 11/975,533, Non-Final Office Action mailed Oct. 9, 2012.

U.S. Appl. No. 10/139,503, Non-Final Office Action mailed Dec. 19, 2005.

U.S. Appl. No. 10/139,503, Final Office Action mailed Feb. 2, 2007.

U.S. Appl. No. 10/139,503, Non-Final Office Action mailed Sep. 25, 2007.

U.S. Appl. No. 10/139,503, Final Office Action mailed Jul. 1, 2008.

* cited by examiner

ANALYTICALLY DETERMINING REVENUE OF INTERNET COMPANIES USING INTERNET METRICS

RELATED APPLICATION

The present application is a divisional of co-pending U.S. patent application Ser. No. 10/139,503 filed on May 3, 2002 which claims the benefit of U.S. Provisional Application No. 60/288,769 filed on May 4, 2001, entitled "Methods for Analytically Determining Revenue of Internet Companies Using Internet Metrics."

BACKGROUND OF OUR INVENTION

1. Field of the Invention

Our invention relates to methods for analytically determining the revenue of certain types of Internet companies. More particularly, our invention relates to methods for using Web based and equipment based metrics related to Internet companies for analytically determining the current revenue and statistically projecting the future revenue of these companies.

2. Description of the Background

People are continuing to use the Internet as a medium for communication, education, entertainment, information exchange, electronic commerce (E-commerce), etc. Accordingly, new businesses are emerging and businesses in virtually every sector of the economy are using the Internet to provide new services and reach new and existing customers more effectively and cheaply. In particular, this invention relates to firms including pure E-commerce companies, "click and mortar" companies, portals, and Internet Service Providers (ISPs). Hereinafter, these types of companies will be collectively referred to as "Internet" companies. Although there are many other types of companies whose business relates to the Internet, our focus is on the types of Internet companies just listed.

The financial community typically does not become aware of the revenues generated by "traditional" companies until several weeks after the company quarters end, when revenue data is announced. The same holds true for the above "Internet" companies. Although past quarterly data is useful, the financial community needs daily, weekly, and monthly information, as well as projections to the end of the quarter, to aid in their everyday decision-making. As such, there is a need by the financial community to estimate and forecast the revenue performance of the Internet sector. In addition to using information directly provided by companies, financial institutions currently use fundamental and technical analysis, such as revenue estimates based on number of employees, past sales analysis, and trend analysis of past revenues, to estimate and forecast revenue. However, given both the rate at which the Internet in general is growing and the volatility within the Internet sector, these estimation and forecast techniques are proving to be inadequate. In addition, there is always a need to make more accurate estimates on a more timely basis.

SUMMARY OF OUR INVENTION

It is desirable to provide methods that overcome the shortcomings of the prior art and more accurately estimate and project, on a more timely basis, the economic performance of an Internet company. Our invention satisfies these and other desires by providing a method performed by a computer for estimating current revenue and projecting future revenue of an Internet company through Web based and equipment based metrics related to that company.

Through experimentation and research, we have discovered that certain physical events that occur at an Internet company's Web environment and the amount of certain types of physical equipment used by an Internet company are strongly correlated to and predictive of the revenue generated by that company. We refer to measures of these physical events and physical equipment as "Internet metrics". Based on our discovery, we have invented methods for estimating current revenue and projecting future revenue of an Internet company, thereby overcoming the issues of the prior art. Specifically, we have discovered that at least four Internet metrics are highly correlated to the revenue generated by Internet companies and when properly modeled, these metrics can be used to estimate company revenue for the current day, week, month, and quarter, and to project company revenue for future days, weeks, months, and quarters.

The Internet metrics we determined to be predictive of revenue include: the number of page hits at a company's Web site ("page-hits metric"), the number of visitors to a company's Web site ("visitors metric"), the number of transactions conducted at a company's Web site ("transactions metric"), and the number of Internet hosts (i.e., IP addresses) supported by an Internet Service Provider ("hosts metric"). A fifth metric, currently under study to verify its correlative nature, is the "delay" within an Internet company's web environment ("delay metric"), which is a measure of how busy the servers, routers, and other equipment are. Each of these metrics represents a numerical count relative to the duration of time over which the metric is measured. As such, "page-hits" represents the sum, over all visitors, of the number of pages browsed by each visitor at an Internet company's Web site over each measurement period. "Visitors" represents the number of "unique" visitors to visit an Internet company's Web site over each measurement period. "Transactions" represents the number of physical transactions to occur at an Internet company's Web site over each measurement period. "Transactions" is based on "https requests" and is currently measured by counting all https-requests that begin with "https://". However, transaction counts can also be determined by counting sub-fields of the "https://" requests. "Hosts" represents the number of IP addresses supported by an ISP over each measurement period. Although we have discovered that these metrics are strong indicators of revenue, nothing in our invention precludes the use of other Internet metrics to estimate revenue as these metrics may arise as the Internet industry continues to develop.

DETAILED DESCRIPTION

Figure 1:
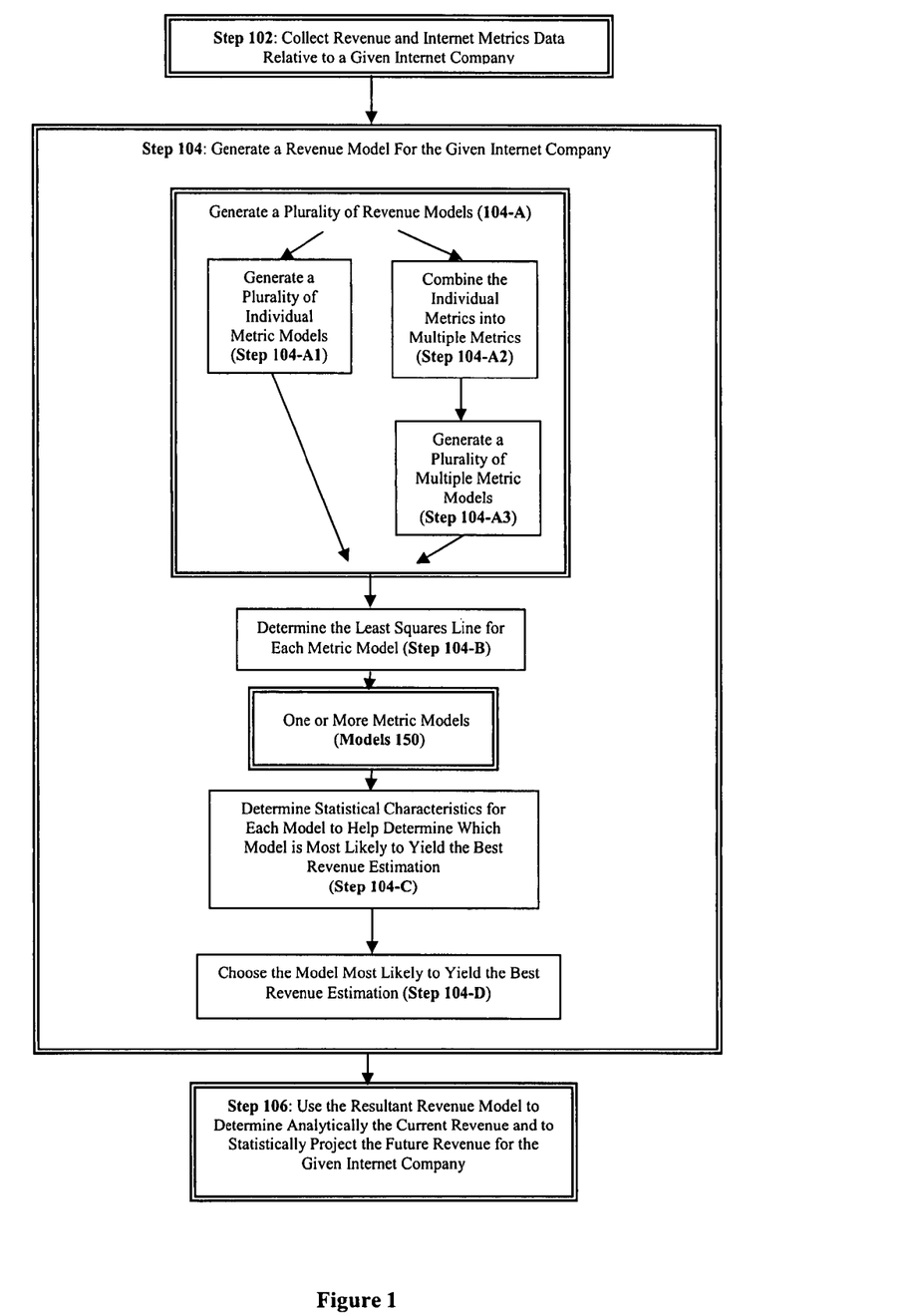
FIG. 1 is a flow chart of a method for determining a revenue model for an Internet company in accordance with the present invention.

Our inventive method for estimating and projecting revenue comprises three general steps, as shown by FIG. 1. In the first step, 102, actual quarterly revenue performance is obtained and one or more of the "Internet metrics" are measured for a given Internet company and are maintained within an on-going computer database. In some instances, only one metric is most relevant to a given company and, in other instances, multiple metrics are most relevant. In the second step, 104, the revenue and measured Internet metric data from prior quarters are used to perform regression analyses in order to generate multiple models that reflect the relationship between the Internet metrics and revenue. From these models, one is selected that will most likely yield the best revenue estimates. In the last step, 106, the resultant model and current Internet metric data are used to estimate the revenue for the current day, week, month, and quarter, and to project the revenue for future days, weeks, months, and quarters. Each of these steps is further described below. The methods in accordance with embodiments of our invention are executed by a computer. For example, as illustrated in FIG. 2, software control for the method steps in accordance with the present invention may be stored as software in memory 204 and executed on processor 205 within computer 202.

The first general step of our invention, step 102, requires the on-going collection of data points, these data points constituting actual quarterly revenue performance and the Internet metrics. The revenue data is readily available, as it is publicly released following the end of a quarter. The Internet metrics are not as easily obtained although various methods exist; however, no one method is critical to our invention. In general, data points relative to the page-hits, transactions, and visitors metrics are obtained by examining the Web activity related to consumers browsing an Internet company's Web site. Data points relative to the hosts metric and delay metric are more difficult to obtain. Several Internet collection methods are briefly described below, which methods can be categorized as direct and indirect. Regardless of the method of collection used, the results are ultimately stored in a database, such as a database 206 in computer 202, and are required for steps 104 and 106 of our invention, as described below.

A first collection method is to obtain the data directly from an Internet company. For example, Web servers typically log access activity. These logs can be used to determine data points for the transactions, visitors, and page-hits metrics. Hosts counts can be obtained directly from an ISP's management systems. This data can subsequently be uploaded to computer 202.

Figure 2:
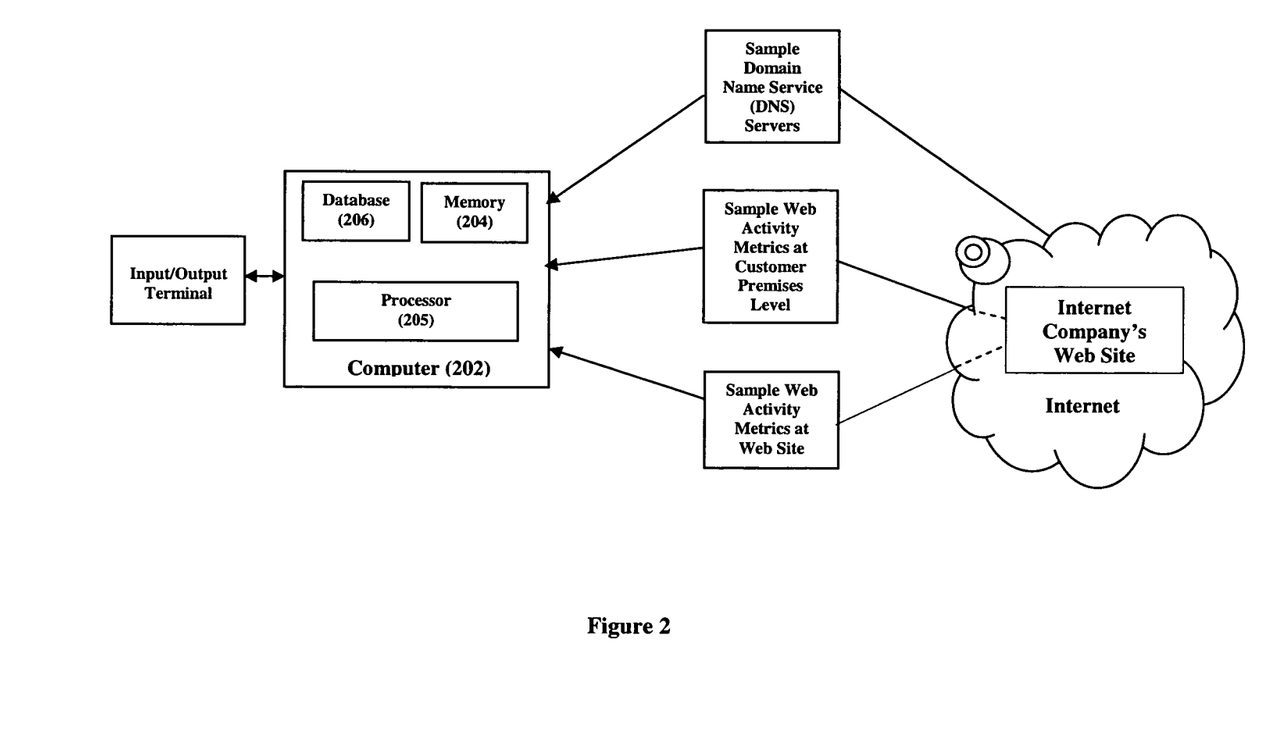
FIG. 2 is a high level block diagram of a computer, Internet company Web site, and processors for collecting Web based and equipment based metrics, on which computer can be implemented methods for estimating current revenue and for projecting future revenue of the Internet company based on the collected Web and equipment based metrics in accordance with the present invention.

A second collection method is to indirectly obtain the metrics, without the help of an Internet company, as seen in FIG. 2. One such method is to collect the page-hits, transactions, and visitors metrics through random sampling. Under this method, a population set is chosen and each member of this set agrees to have his/her personal computer log all Internet activity relative to particular Internet companies. These logs are then analyzed and the results statistically adjusted to represent the public in general. Several companies currently provide such services. A second method to gather the page-hits, transactions, and visitors metrics is to physically monitor a network and gather the data, discarding user specific data. With respect to the delay metric, one method is to transmit test packets to a companies web server(s) and measure the response time. Sophisticated algorithms are applied to this response time to eliminate time spent within the public Internet network and to estimate how "busy" the equipment (routers, servers, etc.) within the Web environment is. With respect to the hosts metric, U.S. Pat. No. 6,178,451 B1, "Computer Network Size Growth Forecasting Method and System", by C. Huitema and S. Weerahandi, describes a method for obtaining an ISP's hosts counts, the teachings of which are incorporated herein by reference. Nothing in our invention precludes using other methods for collecting data.

Once collected, the revenue and Internet metric data points are categorized into three general categories: (1) past actual revenue performance, (2) past Internet metrics, and (3) current Internet metrics. With respect to the terms "past" and "current", "past" data is all data collected up through the most recently reported quarterly revenue and "current" data is all data collected since the most recently reported quarterly revenue. In accordance with the methods of our invention, the past revenue and past Internet metric data are used to generate a revenue model (step 104) that is subsequently applied to the current Internet metrics to estimate and project revenue (step 106).

Because data collection is on going, at the close of a quarter, the current data becomes past data and is subsequently used to generate a model for the next quarter. However, our research has shown that due to the volatility and rate at which the Internet industry is changing, "past" data becomes less predictive of revenue the "older" the past data becomes. As such, in accordance with the methods of our invention, no more than six quarters of past revenue and Internet metric data are used to generate the next quarter's model. From a pictorial standpoint, a "moving-window" is placed over the data and advanced by one quarter at the end of each quarter. However, as the Internet industry stabilizes, nothing in our invention precludes the widening or narrowing of this window to include more or less past data in generating models As indicated, past revenue is collected on a quarterly basis due to the methods of reporting. For the purposes of discussion, these quarterly data points can be expressed as a data set as shown in equation (1), where "m" represents the most recently reported quarterly revenue and "n" represents the number of quarters over which the regression analysis will be performed (as indicated, n is currently set to 6).

$$\{R\} = \{\ldots, R_{(m-n)}, \ldots, R_{(m-2)}, R_{(m-1)}, R_m\} \quad (1)$$

With respect to the Internet metrics, each metric represents a count of a physical event or physical device. Currently, the collection methods used by our invention measure these events and devices on a weekly basis, although daily, monthly, or quarterly counts can also be made depending on the method of collection. Not all metrics apply to all companies and therefore not all counts are performed for all companies. Assuming, for discussion purposes, that all five metrics described above are collected for a given company on a weekly basis, the set of weekly metric data points for each metric can be expressed as equations (2-6)

$$\{D_{trans}\} = \{\ldots, D_{(trans)(k-j)}, \ldots, D_{(trans)(k-2)}, D_{(trans)(k-1)}, D_{(trans)k}, D_{(trans)(k+1)}, D_{(trans)(k+2)}, \ldots\} \quad (2)$$

$$\{D_{page\text{-}hits}\} = \{\ldots, D_{(page\text{-}hits)(k-j)}, \ldots, D_{(page\text{-}hits)(k-2)}, D_{(page\text{-}hits)(k-1)}, D_{(page\text{-}hits)k}, D_{(page\text{-}hits)(k+1)}, D_{(page\text{-}hits)(k+2)}, \ldots\} \quad (3)$$

$$\{D_{visitors}\} = \{\ldots, D_{(visitors)(k-j)}, \ldots, D_{(visitors)(k-2)}, D_{(visitors)(k-1)}, D_{(visitors)k}, D_{(visitors)(k+1)}, D_{(visitors)(k+2)}, \ldots\} \quad (4)$$

$$\{D_{hosts}\} = \{\ldots, D_{(hosts)(k-j)}, \ldots, D_{(hosts)(k-2)}, D_{(hosts)(k-1)}, D_{(hosts)k}, D_{(hosts)(k+1)}, D_{(hosts)(k+2)}, \ldots\} \quad (5)$$

$$\{D_{delay}\} = \{\ldots, D_{(delay)(k-j)}, \ldots, D_{(delay)(k-2)}, D_{(delay)(k-1)}, D_{(delay)k}, D_{(delay)(k+1)}, D_{(delay)(k+2)}, \ldots\} \quad (6)$$

where the $k^{th}$ data point is the last weekly measurement made for the last quarter, the $(k-j)^{th}$ data point is the oldest past data point that will be used to determine the current model, and the $(k+1)^{th}$, $(k+2)^{th}$, etc. data points are weekly measurements for the current quarter.

In accordance with the methods of our invention, determination of the revenue models in step 104 below requires that the data points comprising the past Internet metrics be expressed on the same scale as the revenue data. As a result, assuming again that all five metrics are collected for a given company on a weekly basis, the $(k-j)^{th}$ to $k^{th}$ data points in equations (2)-(6) must be combined and scaled to "quarterly" counts prior to beginning step 104. The result is a new set of "Past" "quarterly" metric data points and can be expressed as shown in equations (7)-(11), where "m" represents the quarterly data point corresponding to the most recently reported quarterly revenue and "n" represents the number of quarters over which the regression analysis will be performed.

$$\{P_{trans}\} = \{\ldots, P_{(trans)(m-n)}, \ldots, P_{(trans)(m-2)}, P_{(trans)(m-1)}, P_{(trans)m}\} \quad (7)$$

$$\{P_{page\text{-}hits}\} = \{\ldots, P_{(page\text{-}hits)(m-n)}, \ldots, P_{(page\text{-}hits)(m-2)}, P_{(page\text{-}hits)(m-1)}, P_{(page\text{-}hits)m}\} \quad (8)$$

$$\{P_{visitors}\} = \{\ldots, P_{(visitors)(m-n)}, \ldots, P_{(visitors)(m-2)}, P_{(visitors)(m-1)}, P_{(visitors)m}\} \quad (9)$$

$$\{P_{hosts}\} = \{\ldots, P_{(hosts)(m-n)}, \ldots, P_{(hosts)(m-2)}, P_{(hosts)(m-1)}, P_{(hosts)m}\} \quad (10)$$

$$\{P_{delay}\} = \{\ldots, P_{(delay)(m-n)}, \ldots, P_{(delay)(m-2)}, P_{(delay)(m-1)}, P_{(delay)m}\} \quad (11)$$

With respect to estimating revenue using the current Internet metrics, the revenue model resulting from the regression analysis in step 104 is a quarterly model because the regression analysis is performed on quarterly representations of the past data points. As such, if a full quarter of current metric data has been collected, this data can be combined and scaled to a quarterly count to estimate the current quarterly revenue. However, in accordance with the methods of our invention, the revenue model can also be scaled to daily, weekly, and monthly revenue models and can be used to estimate revenue for the current day, week, or month by applying corresponding expressions of the current data. The use of the revenue model is further described below in step 106.

Turning to the second general step of our invention, step 104, the revenue data set and past Internet data sets obtained for a given company from the data collection step above are next statistically analyzed to generate revenue models of this company. Specifically, steps 104-A through 104-D illustrate the steps a computer, for example computer 202 in FIG. 2, would perform to generate revenue models of a given company and to select a given model to ultimately estimate current revenue and project future revenue. Methods in accordance with the present invention use regression analysis techniques to generate and select this model.

As indicated above, depending on the type of Internet company, more than one type of Internet metric may apply. However, it is not readily apparent which metric or whether a combination of metrics will provide the "best" prediction of revenue. As such, under methods consistent with our invention, a plurality of revenue models using different combinations of the metric variables are first generated and from these models the model most likely to yield the best revenue estimate is determined based on statistical characteristics, such as the coefficient of determination ("$r^2$"). Specifically, revenue is first modeled with respect to each metric independently and then modeled with respect to combinations of metrics, resulting in a plurality of revenue models. The model most likely to yield the "best" revenue estimate is then determined and used to estimate current revenue and to project future revenue.

For the purpose of discussion, the following discussion assumes that transactions, page-hits, visitors, and hosts Internet metrics apply to a given company to be analyzed. However, as indicated above, only one or two metrics may be applicable to a given company, in which case fewer models are generated. In addition, the methods of our invention do not preclude the use of additional metrics, as these metrics may evolve as the Internet industry continues to mature. As such, additional models may be generated.

Beginning with step 104-A, a plurality of revenue models is first generated wherein each model uses either a single metric variable or multiple metric variables, the latter models being generated to determine if multiple metrics will have statistical characteristics that will most likely yield a better estimate of revenue than any one metric taken individually. Starting with step 104-A1, the individual metric models are first generated, where each model has the form of the linear equation:

$$R = aM + b \quad (12)$$

where "R" is the estimated revenue, "M" is the quarterly Internet metric, and "a" and "b" are unknown coefficients. While this model can change in the future as the nature of the E-Commerce industry changes, the model in equation (12) has been shown to provide an accurate fit between revenue and the Internet metrics. The result of this first step is four models of the form:

$$R_{(trans)} = (a_{(trans)})(M_{(trans)}) + b_{(trans)} \quad (13)$$

$$R_{(page\text{-}hits)} = (a_{(page\text{-}hits)})(M_{(page\text{-}hits)}) + b_{(page\text{-}hits)} \quad (14)$$

$$R_{(visitors)} = (a_{(visitors)})(M_{(visitors)}) + b_{(visitors)} \quad (15)$$

$$R_{(hosts)} = (a_{(hosts)})(M_{(hosts)}) + b_{(hosts)} \quad (16)$$

In steps 104-A2 and 104-A3, the "multiple" Internet metric revenue models are generated. (Note, as indicated above, this discussion assumes that more than one Internet metric applies to a given Internet company. If only one metric applies, steps 104-A2 and 104-A3 are never executed, step 104-A1 results in a single model, and this model is subsequently used in step 106 below to estimate and forecast revenue.) Our research has shown that the Internet metrics may have a collinear relationship and as such, the variables must be "combined" to address this issue. We chose to combine the metrics using "standard sums", whereby the Internet metrics are standardized using relative unit weights and then added to create a new set of Internet metrics. Each new metric represents a unique combination of the original Internet metrics. Note that nothing in our invention precludes the use of other methods, such as principal component analysis, to combine two or more metrics. Using each new metric, revenue is again modeled multiple times wherein each model has the form of the linear equation:

$$R = aM' + b \quad (17)$$

where "R" is the estimated revenue, "M'" is the new Internet metric, and "a" and "b" are unknown coefficients.

Beginning with step 104-A2, the new set of Internet metrics is created through the "standard sums" technique using combinations of two or more of the quarterly representations of the existing Internet metrics. The result is a new set of metrics, each with a corresponding set of past quarterly data points. Assuming the presence of four metrics as above, eleven new metrics are created as shown by Table 1, the first column showing the new Internet metrics and the second column showing the constituent Internet metrics that comprise each new metric.

TABLE 1

Combined Internet Metrics

| | New Internet Metric | Component Metrics |
|---|---|---|
| 1 | $P_{(trans, page\text{-}hits)}$ | $P_{(trans)}, P_{(page\text{-}hits)}$ |
| 2 | $P_{(trans, visitors)}$ | $P_{(trans)}, P_{(visitors)}$ |
| 3 | $P_{(trans, hosts)}$ | $P_{(trans)}, P_{(hosts)}$ |
| 4 | $P_{(page\text{-}hits, visitors)}$ | $P_{(page\text{-}hits)}, P_{(visitors)}$ |
| 5 | $P_{(page\text{-}hits, hosts)}$ | $P_{(page\text{-}hits)}, P_{(hosts)}$ |
| 6 | $P_{(visitors, , hosts)}$ | $P_{(visitors)}, P_{(hosts)}$ |
| 7 | $P_{(trans, page\text{-}hits, visitors)}$ | $P_{(trans)}, P_{(page\text{-}hits)}, P_{(visitors)}$ |
| 8 | $P_{(trans, page\text{-}hits, hosts)}$ | $P_{(trans)}, P_{(page\text{-}hits)}, P_{(hosts)}$ |
| 9 | $P_{(trans, visitors, hosts)}$ | $P_{(trans)}, P_{(visitors)}, P_{(hosts)}$ |
| 10 | $P_{(page\text{-}hits, visitors, hosts)}$ | $P_{(page\text{-}hits)}, P_{(visitors)}, P_{(hosts)}$ |
| 11 | $P_{(trans, page\text{-}hits, visitors, hosts)}$ | $P_{(trans)}, P_{(page\text{-}hits)}, P_{(visitors)}, P_{(hosts)}$ |

Specifically, the "combining" of the metrics by use of "standard sums" is performed by dividing each data point of the constituent past quarterly Internet metric data sets by a weighting factor and then "summing" corresponding data points (actually, only the most recent "n" elements need be summed). The result is a new metric and corresponding set of "n" past quarterly data points. This procedure is shown below in equations (18), (24), and (28) for the "$P_{(trans,page\text{-}hits)}$", "$P_{(trans,page\text{-}hits,visitors)}$", and "$P_{(trans,page\text{-}hits,visitors, hosts)}$" metrics respectively. The other eight metrics are similarly defined by equations (19) to (23) and (25) to (27), not shown.

where "$W_{(trans)}$", "$W_{(visitors)}$", and "$W_{(page\text{-}hits)}$" are the weighting factors. Our invention currently defines the weighting factor as the standard deviation of each Internet metric data set, equations (7)-(10), over the "n" most recent values. Our research has shown that the collinearity between the metrics is adequately accounted for by using standard deviation as the weighting factor. However, our invention does not preclude the use of other weighting factors. The "$W_{(trans)}$", "$W_{(visitor)}$", and "$W_{(page\text{-}hits)}$" "$W_{(hosts)}$" weighting factors are shown in equations (29)-(32) below.

$$W_{(trans)} = \sigma_{(trans)} = \frac{\sum_{i=m-n}^{m}(P_{(trans)i})^2 - (n)(\overline{P_{(trans)}})^2}{(n-1)} \tag{29}$$

$$W_{(page\text{-}hits)} = \sigma_{(page\text{-}hits)} \tag{30}$$

$$= \frac{\sum_{i=m-n}^{m}(P_{(page\text{-}hits)i})^2 - (n)(\overline{P_{(page\text{-}hits)}})^2}{(n-1)}$$

$$W_{(visitors)} = \sigma_{(visitors)} \tag{31}$$

$$= \frac{\sum_{i=m-n}^{m}(P_{(visitors)i})^2 - (n)(\overline{P_{(visitors)}})^2}{(n-1)}$$

$$W_{(hosts)} = \sigma_{(hosts)} = \frac{\sum_{i=m-n}^{m}(P_{(hosts)i})^2 - (n)(\overline{P_{(hosts)}})^2}{(n-1)} \tag{32}$$

where "$\overline{P_{(trans)}}$", $\overline{P_{(page\text{-}hits)}}$, $\overline{P_{(visitors)}}$, and $\overline{P_{(hosts)}}$ are the average transactions, page-hits, visitors, and hosts metric values as computed over the "n" most recent data elements in equations (7)-(10), respectively.

In step 104-A3, the eleven new metrics are each modeled as a linear equation resulting in eleven additional models, three of which, "$R_{(trans,page\text{-}hits)}$", "$R_{(trans,page\text{-}hits,visitors)}$", and "$R_{(trans,page\text{-}hits,visitors, hosts)}$" are shown below in equations $$\{P_{(trans,page\text{-}hits)}\} = \left\{\frac{\{P_{(trans)}\}}{W_{(trans)}}\right\} + \left\{\frac{\{P_{(page\text{-}hits)}\}}{W_{(trans)}}\right\} \tag{18}$$

$$= \left\{\left(\frac{P_{(trans)(m-n)}}{W_{(trans)}} + \frac{P_{(page\text{-}hits)(m-n)}}{W_{(page\text{-}hits)}}\right), \ldots, \left(\frac{P_{(trans)m}}{W_{(trans)}} + \frac{P_{(page\text{-}hits)m}}{W_{(page\text{-}hits)}}\right)\right\}$$

$$\vdots$$

$$\{P_{(trans,page\text{-}hits,visitors)}\} = \left\{\frac{\{P_{(trans)}\}}{W_{(trans)}}\right\} + \left\{\frac{\{P_{(page\text{-}hits)}\}}{W_{(page\text{-}hits)}}\right\} + \left\{\frac{\{P_{(visitors)}\}}{W_{(visitors)}}\right\} \tag{24}$$

$$= \left\{\left(\frac{P_{(trans)(m-n)}}{W_{(trans)}} + \frac{P_{(page\text{-}hits)(m-n)}}{W_{(page\text{-}hits)}} + \frac{P_{(visitors)(m-n)}}{W_{(visitors)}}\right), \ldots, \left(\frac{P_{(trans)m}}{W_{(trans)}} + \frac{P_{(page\text{-}hits)m}}{W_{(page\text{-}hits)}} + \frac{P_{(visitors)m}}{W_{(visitors)}}\right)\right\}$$

$$\vdots$$

$$\{P_{(trans,page\text{-}hits,visitors,hosts)}\} = \left\{\frac{\{P_{(trans)}\}}{W_{(trans)}}\right\} + \left\{\frac{\{P_{(page\text{-}hits)}\}}{W_{(page\text{-}hits)}}\right\} + \left\{\frac{\{P_{(visitors)}\}}{W_{(visitors)}}\right\} + \left\{\frac{\{P_{(hosts)}\}}{W_{(hosts)}}\right\} \tag{28}$$

$$= \left\{\left(\frac{P_{(trans)(m-n)}}{W_{(trans)}} + \frac{P_{(page\text{-}hits)(m-n)}}{W_{(page\text{-}hits)}} + \frac{P_{(visitors)(m-n)}}{W_{(visitors)}} + \frac{P_{(hosts)(m-n)}}{W_{(hosts)}}\right), \ldots, \left(\frac{P_{(trans)m}}{W_{(trans)}} + \frac{P_{(page\text{-}hits)m}}{W_{(page\text{-}hits)}} + \frac{P_{(visitors)m}}{W_{(visitors)}} + \frac{P_{(hosts)m}}{W_{(hosts)}}\right)\right\}$$

(33), (39), and (43). The remaining eight equations are similarly defined by equations (34) to (38) and (40) to (42), not shown.

$$R_{(trans,page\text{-}hits)} = (a_{(trans,page\text{-}hits)})(M_{(trans,page\text{-}hits)}) + b_{(trans,page\text{-}hits)} \quad (33)$$

$$R_{(trans,page\text{-}hits,visitors)} = (a_{(trans,page\text{-}hits,visitors)})(M_{(trans,page\text{-}hits,visitors)}) + b_{(trans,page\text{-}hits,visitors)} \quad (39)$$

$$R_{(trans,page\text{-}hits,visitors,hosts)} = (a_{(trans,page\text{-}hits,visitors,hosts)})(M_{(trans,page\text{-}hits,visitors,hosts)}) + b_{(trans,page\text{-}hits,visitors,hosts)} \quad (43)$$

In step 104-B, the "least squares line" or "regression line" is determined for each individual and multiple metric model, (13)-(16) and (33)-(43), by determining the least squares estimate for each of the model coefficients: "$a_{(trans)}$", "$b_{(trans)}$", "$a_{(trans,page\text{-}hits)}$", "$b_{(trans,page\text{-}hits)}$", "$a_{(trans,page\text{-}hits, visitors)}$", etc. Using the revenue data set equation (1), the past individual metric data sets equations (7)-(10), and the new combined metric data sets equations (18)-(28), the least squares estimate of each coefficient is determined, as shown in equations (44)-(75) for the "$a_{(trans)}$", "$b_{(trans)}$", "$a_{(trans, page\text{-}hits)}$", "$b_{(trans, page\text{-}hits)}$", "$a_{(trans, page\text{-}hits, visitors, hosts)}$", "$b_{(trans, page\text{-}hits, visitors, hosts)}$" coefficients. The least squares estimate equations for the remaining twenty-four coefficients are similarly defined by equations (46) to (51) and (54) to (73), not shown $$\hat{a}_{(trans)} = \frac{\sum_{i=m-n}^{m}(P_{(trans)i})(R_i) - (n)(\overline{P_{trans}})(\overline{R})}{\sum_{i=m-n}^{m}(P_{(trans)i})^2 - (n)(\overline{P_{(trans)}})^2} \quad (44)$$

$$\hat{b}_{(trans)} = (\overline{R}) - (\hat{a}_{(trans)})(\overline{P_{(trans)}}) \quad (45)$$

$$\vdots$$

$$\hat{a}_{(trans,page\text{-}hits)} = \frac{\sum_{i=m-n}^{m}(P_{(trans,page\text{-}hits)i})(R_i) - (n)(\overline{P_{(trans,page\text{-}hits)}})(\overline{R})}{\sum_{i=m-n}^{m}(P_{(trans,page\text{-}hits)i})^2 - (n)(\overline{P_{(trans,page\text{-}hits)}})^2} \quad (52)$$

$$\hat{b}_{(trans,page\text{-}hits)} = (\overline{R}) - (\hat{a}_{(trans,page\text{-}hits)})(\overline{P_{(trans,page\text{-}hits)}}) \quad (53)$$

$$\vdots$$

$$\hat{a}_{(trans, page\text{-}hits, visitors, hosts)} = \frac{\sum_{i=m-n}^{m}(P_{(trans,page\text{-}hits,visitors,hosts)i})(R_i) - (n)(\overline{P_{(trans,page\text{-}hits,visitors,hosts)}})(\overline{R})}{\sum_{i=m-n}^{m}(P_{(trans,page\text{-}hits,visitors,hosts)i})^2 - (n)(\overline{P_{(trans,page\text{-}hits,visitors,hosts)}})^2} \quad (74)$$

$$\hat{b}_{(trans,page\text{-}hits,visitors,hosts)} = (\overline{R}) - (\hat{a}_{(trans,page\text{-}hits,visitors,hosts)})(\overline{P_{(trans,page\text{-}hits,visitors,hosts)}}) \quad (75)$$

where "n" is the number of past data points in the revenue and metric data sets deemed to be predictive of the current revenue (as indicated above, n=6 quarters is currently used), "$P_{(trans)i}$", "$P_{(trans, page\text{-}hits)i}$", "$P_{(trans, page\text{-}hits, visitors, hosts)i}$", etc. are data points from the original and new metric data sets equations (7)-(10) and (18)-(28), "$R_i$" is data points from the revenue data set equation (1), "$\overline{P_{(trans)}}$", "$\overline{P_{(trans,page\text{-}hits)}}$", "$\overline{P_{(trans,page\text{-}hits,visitors,hosts)}}$", etc. are the "average-metric-value" of each original/new metric data set as computed over the "n" most recent data elements in equations (7)-(10) and (18)-(28), and "$\overline{R}$" is the "average revenue value" as computed over the "n" most recent data elements in equation (1). The result of step 104-B is fifteen revenue estimation equations as shown in equations (76)-(90) ((81) to (85) and (87) to (89) not being shown) and represented by Models 150 in FIG. 1.

$$\hat{R}_{(trans)} = (\hat{a}_{(trans)})(M_{(trans)}) + \hat{b}_{(trans)} \quad (76)$$

$$\hat{R}_{(page\text{-}hits)} = (\hat{a}_{(page\text{-}hits)})(M_{(page\text{-}hits)}) + \hat{b}_{(page\text{-}hits)} \quad (77)$$

$$\hat{R}_{(visitors)} = (\hat{a}_{(visitors)})(M_{(visitors)}) + \hat{b}_{(visitors)} \quad (78)$$

$$\hat{R}_{(hosts)} = (\hat{a}_{(hosts)})(M_{(hosts)}) + \hat{b}_{(hosts)} \quad (79)$$

$$\hat{R}_{(trans,page\text{-}hits)} = (\hat{a}_{(trans,page\text{-}hits)})(M_{(trans,page\text{-}hits)}) + \hat{b}_{(trans,page\text{-}hits)} \quad (80)$$

$$\hat{R}_{(trans,page\text{-}hits, visitors)} = (\hat{a}_{(trans,page\text{-}hits,visitors)})(M_{(trans,page\text{-}hits,visitors)}) + \hat{b}_{(trans,page\text{-}hits,visitors)} \quad (86)$$

$$\hat{R}_{(trans,page\text{-}hits,visitors,hosts)} = (\hat{a}_{(trans,page\text{-}hits,visitors,hosts)})(M_{(trans,page\text{-}hits,visitors,hosts)}) + \hat{b}_{(trans,page\text{-}hits,visitors,hosts)} \quad (90)$$

Each of these equations can be used to estimate the current quarter's revenue if quarterly representations of the combined metrics are available (i.e., a full quarter of data points have been collected).

As indicated, the completion of step 104-B results in a plurality of individual metric and multiple metric revenue models, as shown by the equations above. The next step is to determine which of these models has the statistical properties to likely be the "best" estimator of current revenue. Different methods exist in the art for determining how well a "least squares equation" performs. One method used by our invention is to compute the "coefficient of determination", also called "$r^2$", for the equation, although nothing precludes the use of other methods. The coefficient of determination for any least squares equation ranges in value between "0" and "1", with "0" indicating a weak model fit and "1" indicating a strong model fit.

Beginning with step 104-C, the coefficient of determination is computed for each of the determined metric models, equations (76)-(90). The model with the largest resultant "value" is then chosen, in step 104-D, as the model to estimate current revenue. The equations to compute the coefficient of determination for "$\hat{R}_{(trans)}$", "$\hat{R}_{(trans, page\text{-}hits)}$", "$\hat{R}_{(trans, page\text{-}hits, visitors)}$", and "$\hat{R}_{(trans, page\text{-}hits, visitors, hosts)}$" are shown below in equations (91), (95), (101), and (105). The remaining eleven equations, (92) to (94), (96) to (100), and (102) to (104), are similarly defined.

$$r^2_{(trans)} = 1 - \frac{\sum_{i=m-n}^{m}(R_i - \hat{R}_{(trans)i})^2}{\sum_{i=m-n}^{m}(R_i - \overline{R})^2} \quad (91)$$

$$\vdots$$

$$r^2_{(trans,page-hits)} = 1 - \frac{\sum_{i=m-n}^{m}(R_i - \hat{R}_{(trans,page-hits)i})^2}{\sum_{i=m-n}^{m}(R_i - \bar{R})^2} \quad (95)$$

$$\vdots$$

$$r^2_{(trans,page-hits,visitors)} = 1 - \frac{\sum_{i=m-n}^{m}(R_i - \hat{R}_{(trans,page-hits,visitors)i})^2}{\sum_{i=m-n}^{m}(R_i - \bar{R})^2} \quad (101)$$

$$\vdots$$

$$r^2_{(trans,page-hits,visitors,hosts)} = 1 - \frac{\sum_{i=m-n}^{m}(R_i - \hat{R}_{(trans,page-hits,visitors,hosts)i})^2}{\sum_{i=m-n}^{m}(R_i - \bar{R})^2} \quad (105)$$

where "$\hat{R}_{(trans)i}$" is the estimated revenue using the "n" most recent data points from the transactions metric data set equation (7), "$\hat{R}_{(trans, page-hits)i}$" is the estimated revenue using the "n" most recent data points from the combined transaction/page-hits metric data set equation (18), etc.

In step 104-D, the model with largest coefficient of determination is chosen as the model that will most likely provide the best estimate of current revenue. This model, for discussion purposes, will be referred to as:

$$\hat{R} = \hat{a}M' + \hat{b} \quad (106)$$

where "$\hat{a}$" and "$\hat{b}$" are the "a" and "b" least squares estimate coefficients from the chosen model, and "M'" is the metric (either single or multiple) of the chosen model. In another embodiment of our invention, the individual or multiple metric used to make prior revenue estimates is also considered in step 104-D when choosing the present model.

Turning to the third general step of our invention, step 106, equation (106) can now be used to estimate current revenue and to statistically project future revenue of the modeled Internet company. Revenue estimation will first be described followed by revenue projection.

Equation (106) can be used to estimate a company's current revenue over a given period of time based on current measurements of the M' metric. M' is either an individual or multiple metric. Assume first that M' is an individual metric. As indicated above, the collection methods currently used by our invention measure the metrics on a weekly basis, although daily, monthly, and quarterly measurements can also be made. Assuming weekly measurements are made, the $(k+1)^{th}$, $(k+2)^{th}$, etc. data points from the metric data sets, equations (2)-(6), can now be used to estimate revenue. Specifically, if a full quarter of weekly measurements have been made (e.g., thirteen measurements), the resultant data points can be combined and scaled to a quarterly count and substituted for M' in equation (106) to estimate revenue for the current quarter. However, a more useful application of our invention is to estimate revenue as soon as possible. As such, under methods consistent with our invention, equation (106) can be scaled to estimate revenue for the current week and month, as shown by equations (107) and (108), respectively, were "$x_{week}$" is the number of weeks in the quarter and "$x_{month}$" is the number of months in the quarter.

$$\hat{R}_{week} = \frac{\hat{a}}{x_{week}}M' + \frac{\hat{b}}{x_{week}} \quad (107)$$

$$\hat{R}_{month} = \frac{\hat{a}}{x_{month}}M' + \frac{\hat{b}}{x_{month}} \quad (108)$$

Hence, using equation (107), the weekly metric data points can be used to estimate revenue on a week-by-week basis. By combining and scaling the weekly data points to monthly counts, equation (108) can be used to estimate revenue on a monthly basis. Similarly, if the metric is measured on a daily basis, equation (106) can be scaled to estimate daily revenue.

Assume next that M' is a multiple metric and, for discussion purposes, is a combination of the "transactions" and "page-hits" metrics. Similar to the individual metric, the combined metric can be used to estimate revenue for the current week, month, and quarter through equations (106), (107), and (108). However, similar to step 104-A2 above, the $(k+1)^{th}$, $(k+2)^{th}$, etc. data points of the "$\{D_{trans}\}$" and "$\{D_{page-hits}\}$" data sets, equations (2) and (3), cannot be applied to the revenue equations until these data points are combined using principals similar to equation (18) (i.e., standard sums).

As such, under methods consistent with our invention, the "$\{D_{trans}\}$" and "$\{D_{page-hits}\}$" data sets are first individually expressed as quarterly data points, monthly data points, or maintained as weekly data points, depending on the desired estimate, using all data points from the $(k-j)^{th}$ through the current measurement. Next, using the "standard sum" principals set forth in step 104-A2, a weighting factor is determined for each of the resultant data sets using the standard deviation of these data sets. Finally, the data points of the resultant data sets are weighted and corresponding points are summed, resulting in a new combined data set that can be applied to equations (106), (107), and (108) to estimate current revenue.

For example, using equation (107) to estimate revenue for the current week, equations (109) and (110) show the weekly weighting factors for the "$\{D_{trans}\}$" and "$\{D_{page-hits}\}$" data sets $$W_{(trans)} = \sigma_{(trans)} \quad (109)$$

$$= \frac{\sqrt{\sum_{i=k-j}^{k+g}(D_{(trans)i})^2 - (j+g)(\overline{D_{(trans)}})^2}}{(j+g-1)}$$

$$W_{(page-hits)} = \sigma_{(page-hits)} \quad (110)$$

$$= \frac{\sqrt{\sum_{i=k-j}^{k+g}(D_{(page-hits)i})^2 - (j+g)(\overline{D_{(page-hits)}})^2}}{(j+g-1)}$$

where (k+g) is the most current weekly data point, and "$\overline{D_{(trans)}}$" and "$\overline{D_{(page-hits)}}$" are average weekly metric values over the $(k-j)^{th}$ to $(k+g)^{th}$ data elements. Using these weighting factors, the resultant combined data set is shown in equation (111), the data points of which can be used with equation (107) to estimate the revenue for each week.

$$\{C_{(trans, page-hits)}\} = \left\{\frac{\{D_{(trans)}\}}{W_{(trans)}}\right\} + \left\{\frac{\{D_{(page-hits)}\}}{W_{(trans)}}\right\} \quad (11)$$

$$= \left\{\left(\frac{D_{(trans)(k-j)}}{W_{(trans)}} + \frac{D_{(page-hits)(k-j)}}{W_{(page-hits)}}\right), \ldots, \left(\frac{D_{(trans)(k+g)}}{W_{(trans)}} + \frac{D_{(page-hits)(k+g)}}{W_{(page-hits)}}\right)\right\}$$

Figure 3:
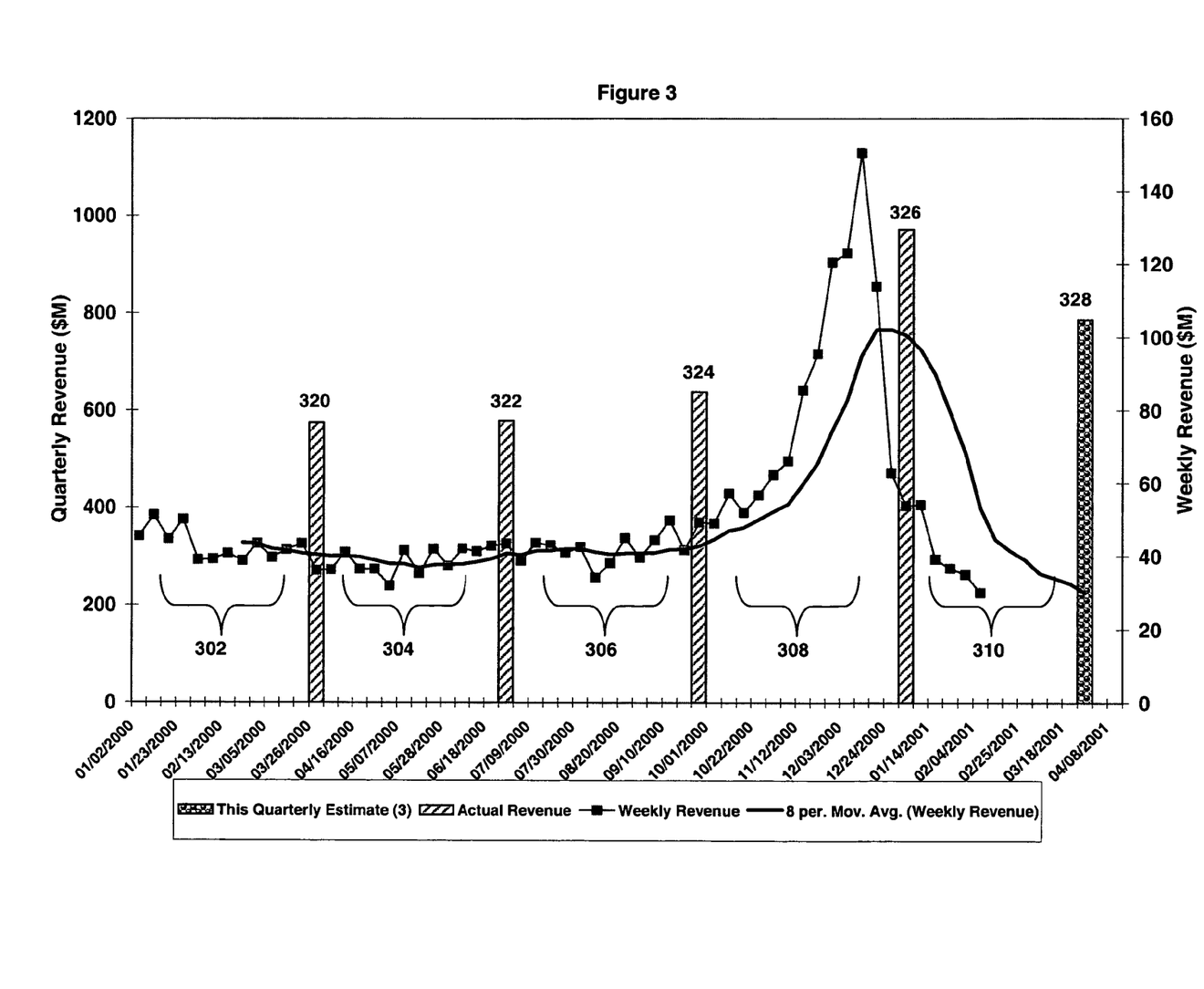
FIG. 3 is a chart illustrating weekly revenue estimates for an Internet company made using methods in accordance with the present invention.

In accordance with the methods of our invention, FIG. 3 shows weekly revenue estimates and actual quarterly revenue results for four quarters for an Internet company. The thirteen points comprising quarters 302, 304, 306, and 308 represent weekly revenue estimates using the methods of our invention. Once a full quarter of revenue estimates are made, the resultant values can be summed to estimate the quarterly revenue, prior to the actual revenue being reported. (As reference, bars 320, 322, 324, and 326 represent actual reported quarterly revenue.)

In addition to estimating revenue for the current day, week, or month, it is also useful, in advance of the availability of metric data for future time periods, to project revenue for the remaining days, weeks, or months of the quarter and to subsequently use the estimated and projected values to project the quarterly revenue as a whole. For example, the five points comprising quarter 310 represent weekly revenue estimates for the current quarter. These points can be used to statistically project the revenue for each of the remaining eight weeks comprising the quarter. Subsequently, the five revenue estimates and the eight revenue projections can be summed to project the quarterly revenue, as shown by bar 328. Under methods consistent with our invention, a "running average technique" is used to make these forecasts thereby capturing the trend of the revenue estimates, however nothing precludes the use of other projection techniques.

More explicitly, the running average technique is used to statistically project the revenue for the remaining eight weeks of quarter 310 as follows. The sixth weekly revenue point is projected by averaging the prior N weekly revenue points beginning with the fifth week. The seventh weekly revenue point is projected by averaging the prior N weekly revenue points beginning with the sixth week (i.e., the projected sixth week is used to project the seventh week). This method is continued until the thirteenth weekly revenue point is projected by averaging the prior N weekly revenue points beginning with the twelfth week. The quarterly revenue is then projected by summing all thirteen weeks, this projection being represented by bar 328 in FIG. 3. This embodiment of our invention currently uses N=6 although other values can be used.

The above-described embodiment of our invention is intended to be illustrative only. Numerous other embodiments may be devised by those skilled in the art without departing from the spirit and scope of our invention.

We claim:

1. A method for estimating current revenue of a company, said method comprising:
   a computing device obtaining from network resources data points associated with the company for at least two Internet metrics over at least first and second past time periods;
   the computing device creating past Internet metric data points for the at least first and second past time periods by combining the data points from the at least two Internet metrics for respective periods of the at least first and second past time periods;
   the computing device generating one or more revenue models for the company by correlating at least the created past Internet metric data points for the first past time period to past revenue data points of the company for the first past time period and the created past Internet metric data points for the second past time period to past revenue data points of the company for the second past time period;
   the computing device determining statistical characteristics of the one or more revenue models respectively;
   the computing device selecting a chosen revenue model based on the statistical characteristics of the chosen revenue model;
   the computing device creating one or more new Internet metric data points for a current time period by combining one or more current data points obtained for the at least two Internet metrics from the current time period; and
   the computing device estimating the current revenue of the company by applying the created new Internet metric data points to the chosen revenue model.

2. The method of claim 1 wherein creating one or more new Internet metric data points includes creating the new Internet metric data points through standard sums.

3. The method of claim 2 further comprising using standard deviations as a weighting factor in the standard sums.

4. The method of claim 1 wherein generating one or more revenue models includes generating one or more quarterly revenue models, the method further comprising the computing device scaling the one or more quarterly revenue models to weekly revenue models, and wherein creating one or more new Internet metric data points includes creating one week of data points, and wherein estimating the company's current revenue includes estimating revenue for the one week.

5. The method of claim 1 wherein combining the data points from the at least two Internet metrics comprises combining at least two of a page-hits metric, a visitors metric, a transactions metric, or a hosts metric.

6. The method of claim 1 wherein obtaining data points from network resources includes obtaining data points from at least one of domain name servers, web activity metrics at a customer premises level, or web activity metrics at a web site.

7. The method of claim 1 wherein the computing device generating the one or more revenue models for the company comprises the computing device performing a regression analysis on the created past internet metric data points and past revenue data points of the company for the first past time period and the created past Internet metric data points and past revenue data points of the company for the second past time period.

8. A tangible computer readable medium, having instructions stored thereon, that in response to execution by a device, cause the device to perform operations comprising:
   obtaining data points associated with a company from network resources for at least two Internet metrics over at least first and second past time periods,
   creating past Internet metric data points for the at least first and second past time periods by combining the data points from the at least two Internet metrics for respective periods of the at least first and second past time periods;

generating one or more revenue models for the company by correlating at least the created past Internet metric data points for the first past time period to past revenue data points of the company for the first past time period and the created past Internet metric data points for the second past time period to past revenue data points of the company for the second past time period;

determining statistical characteristics of the one or more revenue models respectively;

selecting a chosen revenue model based on the statistical characteristics of the chosen revenue model;

creating one or more new Internet metric data points for a current time period by combining one or more current data points obtained for the at least two Internet metrics from the current time period; and estimating the current revenue of the company by applying the created new Internet metric data points to the chosen revenue model.

9. The tangible computer readable medium of claim 8 wherein the new Internet metric data points are created through standard sums.

10. The tangible computer readable medium of claim 9 wherein standard deviations are used as a weighting factor in the standard sums.

11. The tangible computer readable medium of claim 8 wherein the chosen revenue model is a quarterly revenue model, the operations further comprising scaling the chosen revenue model to a weekly revenue model, and wherein the created new Internet metric data points comprise one week of data points, and wherein the estimated company's current revenue is revenue for the one week.

12. The tangible computer readable medium of claim 8 wherein the at least two Internet metrics comprise at least two of a page-hits metric, a visitors metric, a transactions metric, or a hosts metric.

13. The tangible computer readable medium of claim 8 wherein the network resources comprise at least one of domain name servers, web activity metrics at a customer premises level, or web activity metrics at a web site.

14. The tangible computer readable medium of claim 8 wherein generating one or more revenue models comprises performing a regression analysis on the created past Internet metric data points and past revenue data points of the company for the first past time period and the created past Internet metric data points and past revenue data points of the company for the second past time period.

15. An apparatus for estimating the current revenue of a company, the apparatus comprising:
a computing device configured to:
receive past data points of at least two internet metrics associated with the company for at least first and second past time periods and current data points of the at least two internet metrics for a current time period from network resources;

create a combination of the past data points for the at least first and second past time periods respectively;

generate one or more revenue models for the company by correlating at least the combination of the past data points for the first past time period to past revenue data points of the company for the first past time period and the combination of the past data points for the second past time period to past revenue data points of the company for the second past time period;

determine statistical characteristics of the one or more revenue models respectively;

select a chosen revenue model based on the statistical characteristics of the chosen revenue model; and estimate a current revenue for the company by applying a combination of the current data points to the chosen revenue model.

16. The apparatus of claim 15 wherein the computing device is configured to receive past and current data points from network resources that comprise at least one of domain name servers, web activity metrics at a customer premises level, or web activity metrics at a web site.

17. The apparatus of claim 15 wherein the computing device is further configured to apply weighting factors to create the combination of the past data points, the at least two Internet metrics comprising at least two of a page-hits metric, a visitors metric, a transactions metric, or a hosts metric.

18. The apparatus of claim 15 wherein the computing device is further configured to create the combination of the current data points using standard sums.

19. The apparatus of claim 18 wherein the computing device is further configured to use standard deviations as a weighting factor in the standard sums.

20. The apparatus of claim 15 wherein the computing device configured to generate one or more revenue models for the company comprises the computing device configured to perform a regression analysis on the combination of the past data points and the past revenue data points of the company for the first past time period and the second past time period respectively.

* * * * *